(12) United States Patent
Curry

(10) Patent No.: US 8,979,213 B2
(45) Date of Patent: Mar. 17, 2015

(54) APPARATUS AND METHOD FOR INCREASING THE TRACTION OF VEHICLE WHEELS

(76) Inventor: Michael D. Curry, Centreville, VA (US)

( * ) Notice: Subject to any disclaimer, the term of this patent is extended or adjusted under 35 U.S.C. 154(b) by 447 days.

(21) Appl. No.: 13/156,950

(22) Filed: Jun. 9, 2011

(65) Prior Publication Data

US 2012/0313424 A1 Dec. 13, 2012

(51) Int. Cl.
*B60B 15/00* (2006.01)
*B60C 27/02* (2006.01)

(52) U.S. Cl.
CPC .................................. *B60C 27/0223* (2013.01)
USPC ............................ 301/44.1; 152/181; 152/222

(58) Field of Classification Search
USPC ......... 301/41.1, 43, 44.1, 44.2; 152/162, 167, 152/170, 174, 178, 181, 208, 213 R, 221, 152/222, 225 R, 226, 227, 228, 229
See application file for complete search history.

(56) References Cited

U.S. PATENT DOCUMENTS

| | | | |
|---|---|---|---|
| 2,533,151 A | 12/1950 | Stevens | |
| D214,736 S | 7/1969 | Anderson et al. | |
| 4,050,495 A | 9/1977 | Olsen | |
| 4,346,748 A | 8/1982 | Bagoy et al. | |
| 5,454,412 A | 10/1995 | Bowers | |
| 5,520,691 A | 5/1996 | Branch | |
| 6,016,856 A * | 1/2000 | Hynes | 152/190 |
| 6,142,202 A | 11/2000 | Hicks | |
| 6,708,746 B2 * | 3/2004 | Wilkinson | 152/221 |
| 6,860,304 B1 | 3/2005 | Dalrymple | |
| D540,993 S | 4/2007 | Beyaz | |
| D554,578 S | 11/2007 | Roed | |
| D559,173 S | 1/2008 | Roed | |
| D597,481 S | 8/2009 | Toren | |
| D689,014 S | 9/2013 | Cox | |
| 2004/0108772 A1 | 6/2004 | Pribyl et al. | |
| 2004/0154717 A1 | 8/2004 | Gray | |
| 2010/0212117 A1 | 8/2010 | Haase et al. | |
| 2012/0025596 A1 * | 2/2012 | Dunham | 301/42 |
| 2012/0112430 A1 | 5/2012 | Shaw | |
| 2012/0153707 A1 | 6/2012 | Dondurur et al. | |
| 2012/0324679 A1 | 12/2012 | Haase et al. | |

OTHER PUBLICATIONS

Rice, Fritz, "Snowpocalypse. Dutch Bike Co Weblog" [online], Nov. 24, 2011 [retrieved on Aug. 20, 2012], Retrieved from the Internet: <URL:http://www.dutchbikeco.com/_blog/Dutch_Bike_Co_Weblog/post/Seattle_Snowpocalypse/.
International Search Report Issued in International Patent Application No. PCT/US2012/041619 on Sep. 14, 2012.

(Continued)

*Primary Examiner* — Kip T Kotter
*Assistant Examiner* — Jean Charleston
(74) *Attorney, Agent, or Firm* — Venable LLP; Steven J. Schwarz

(57) ABSTRACT

A traction device for a vehicle wheel can include a first locking segment and a second locking segment adapted to receive the first locking segment in a first direction. The second locking segment can be adapted to stop movement of the first locking segment through the second locking segment in a second direction opposite to the first direction. At least one traction element can be located between the first locking segment and the second locking segment. A method of attaching a traction device to a vehicle wheel including a rim and a tire is also described.

8 Claims, 5 Drawing Sheets

(56) References Cited

OTHER PUBLICATIONS

Written Opinion issued in International Patent Application No. PCT/US2012/041619 on Sep. 14, 2012.
Office Action issued Oct. 2, 2013 in related U.S. Appl. No. 29/393,820.
Notice of Allowance issued Dec. 18, 2013 in related U.S. Appl. No. 29/393,820.
Redleg, First ride of 2011: Jarre Canyon Rd and Red Rocks Park, webpage, Jan. 1, 2011.
Office Action issued Feb. 3, 2014 in related Design U.S. Appl. No. 29/412,971.

* cited by examiner

APPARATUS AND METHOD FOR INCREASING THE TRACTION OF VEHICLE WHEELS

TECHNICAL FIELD

The present application relates generally to apparatuses and methods usable to increase the traction of vehicle wheels. More specifically, the present application relates to apparatuses that can be attached to vehicle wheels, such as around the tires, to improve the traction of the tires, and related methods.

BACKGROUND

All season automobile tires typically provide sufficient amounts of traction for normal on-road use during both wet and dry conditions. However, when driving on snow-covered or ice-covered roads, or when driving off road, conventional all season tires may not provide sufficient amounts of traction for safe travel. As a result, tires designed specifically for use in wintry conditions, as well as off-road specific tires, are available. Drivers may not always have winter tires or off-road specific tires on their vehicle when needed, for example, when caught off guard by an early season or late season snow storm, or when unexpectedly travelling off road. As a result, snow chains have been developed for increasing the traction of tires in emergency situations.

Conventional snow chains involve a web of chains that wrap around the circumference of a vehicle tire. Due to their design, however, conventional snow chains can be cumbersome and time consuming to apply to the vehicle tires, discouraging their use. In addition, conventional snow chains are often bulky and heavy, and take up an undesirable amount of vehicle storage space. As a result, some drivers are reluctant to carry conventional snow chains in their vehicles, and may not have them when confronted with a surprise weather situation or road surface that would necessitate their use. Accordingly, there remains a need in the art for apparatuses and methods for increasing the traction of vehicle tires that remedy the aforementioned and/or other drawbacks of the prior art.

SUMMARY

According to an embodiment, a traction device for a vehicle wheel can include a first locking segment and a second locking segment adapted to receive the first locking segment in a first direction. The second locking segment can be adapted to stop movement of the first locking segment through the second locking segment in a second direction opposite to the first direction. At least one traction element can be located between the first locking segment and the second locking segment.

The present application is also directed to a method of attaching a traction device to a vehicle wheel, which includes a rim and a tire. The method can include inserting a first end of the traction device through an opening in the rim, wrapping the traction device around the rim and tire in a poloidal direction, and locking the first end of the traction device to a second end of the traction device to form a closed loop around the rim and tire in the poloidal direction.

Further aspects, objectives, and advantages, as well as the structure and function of exemplary embodiments, will become apparent from a consideration of the description, drawings, and examples.

BRIEF DESCRIPTION OF THE DRAWINGS

The foregoing aspects and other features and advantages of the invention will be apparent from the following drawings, wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention. All references cited herein are incorporated by reference as if each had been individually incorporated.

Figure 1:
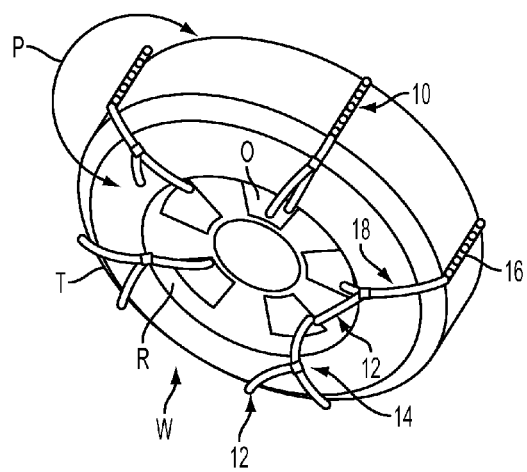
FIG. 1 is a front-side perspective view of a vehicle wheel including example traction devices fastened around the rim and tire, according to a first embodiment.

Referring to FIG. 1, a first embodiment of a traction device 10 for a vehicle wheel W is shown. Specifically, FIG. 1 shows five traction devices 10 attached to the vehicle wheel W, however, fewer or more traction devices 10 can be applied to a particular wheel W depending on the application. As shown in FIG. 1, the vehicle wheel W generally includes a rim R and a tire T, and each traction device 10 wraps around the rim R and tire T in a substantially poloidal direction P, for example, around the tire T and through opening O in the rim R. The traction devices can be quickly and easily applied to the wheel W in emergency conditions, such as snow or ice, and can be easily removed when the emergency conditions cease. Due to the relatively compact, lightweight, and flexible configuration of the traction devices 10, they can be easily stored in a vehicle, such as in a glove box, trunk, or other common storage compartment.

Figure 2:
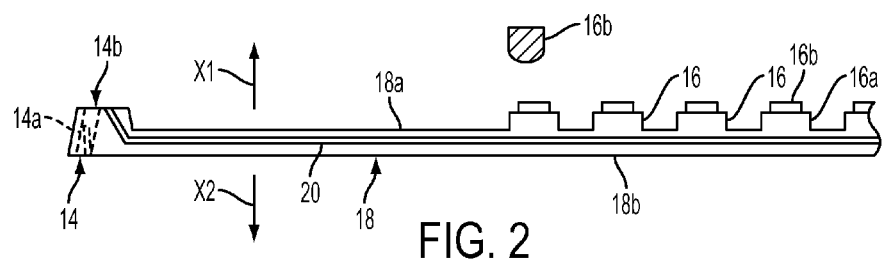
FIG. 2 is a partially-exploded, side view of an example traction device of FIG. 1.

Referring to FIGS. 1 and 2, each traction device 10 can generally include a first locking segment 12 and a second locking segment 14 that connect with one another to secure the traction device 10 to the wheel W, for example, around the poloidal dimension P of the wheel W. According to an embodiment, second locking segment 14 can include an aperture 14a that receives the first locking segment 12 in a sliding manner. The second locking segment 14 can further include a pawl 14b located in the aperture 14a, and the underside 18b of the first locking segment 12 can include teeth (not illustrated) that engage with the pawl 14b. The arrangement of the pawl 14b and teeth can allow the second locking segment 12 to slide into the aperture 14a in a first direction X1, while substantially preventing the locking segment 12 from sliding backwards out of the aperture 14a in a second direction X2 substantially opposite to the first direction X1. This type of configuration can allow a user to wrap the traction device 10 around the rim R and tire T, and slide the first locking segment 12 into the second locking segment 14 until the traction device 10 is tightly secured around the rim R and tire T. According to an embodiment, the first and second locking segments 12, 14 can be opposite end portions of a Zip-Tie, however, other configurations are possible.

Still referring to FIGS. 1 and 2, the traction device 10 can also include one or more traction elements 16 that increase the tire T's traction on snowy, icy, or other slippery road conditions. According to the embodiment shown, the traction device 10 comprises an elongated band 18 that connects the first locking segment 12 and the second locking segment 14, and the traction elements 16 can comprise raised lugs that protrude upwards from an upper surface 18a of the elongated band 18, however, other configurations are possible. According to an embodiment, the device 10 can comprise between 6 and 20 raised lugs, however, other amounts are possible. According to the embodiment shown in FIGS. 1 and 2, the traction elements 16 can be integral with the elongated band 18, e.g., co-molded with the elongated band 18, however, the traction elements 16 can alternatively be separate pieces that are secured to the elongated band 18, for example, by bonding, screwing, or other fastening techniques known in the art.

Referring to FIG. 2, the raised lugs 16 can comprise a base portion 16a, such as a substantially cylindrical base portion, and a smaller spike 16b that projects from the base portion 16a. The base may provide traction in snow, while the spike may provide traction in ice. Other shapes and configurations of the raised lugs 16 are possible, however, such as square, triangular, star-shaped, as well as other shapes and combinations of shapes. According to an embodiment, the base portion 16a can extend approximately ½" inch from the upper surface of the elongated band 18, and the spike portion 16b can extend approximately ¼" above the base portion 16a, however, other dimensions are possible.

In the embodiment of FIG. 2, the raised lugs 16 each comprise a substantially cylindrical base portion 16a, and a metal spike 16b that is fastened to the base portion 16a using threads. For example, the metal spike 16b can comprise a set screw. According to alternative embodiments, the metal spike 16b can be molded into the base portion 16a, or can be attached thereto using other fastening techniques known in the art.

Figure 11:
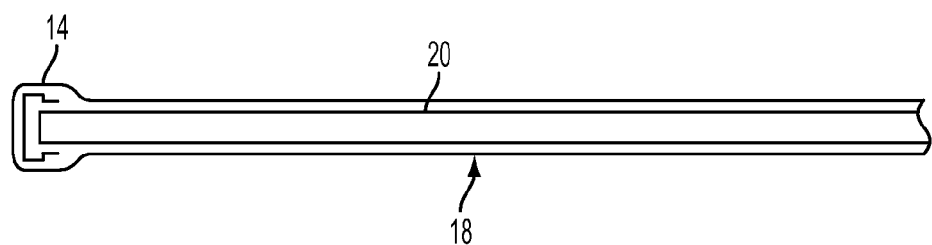
FIG. 11 is a top view of a portion of an example elongated band and second locking segment according to example embodiments.

Referring to FIG. 2 in conjunction with FIG. 11, an embodiment of the elongated band 18 and second locking segment 14 are shown. According to the embodiment shown, a reinforcing wire 20, such as a metal wire, can extend through at least a portion of the elongated band 18 and/or or through the second locking segment 14. The reinforcing wire 20 can strengthen the elongated band 18 and/or the junction of the elongated band 18 and the second locking segment 14. As shown in FIG. 11, the reinforcing wire 20 can extend along one side of the elongated band 18, into the second locking segment 14, and return to the other side of the elongated band 18, however other shapes and orientations of the reinforcing wire 20 are possible.

Figure 3A:
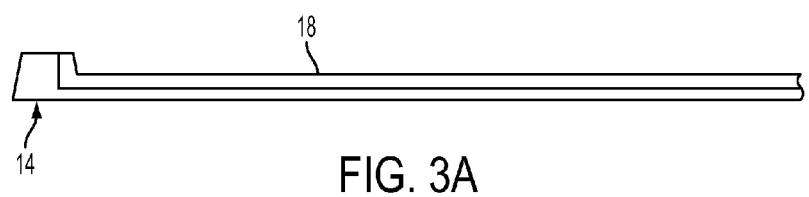
FIG. 3A is a side view of portion of an example traction device according to a second embodiment.
Figure 3B:
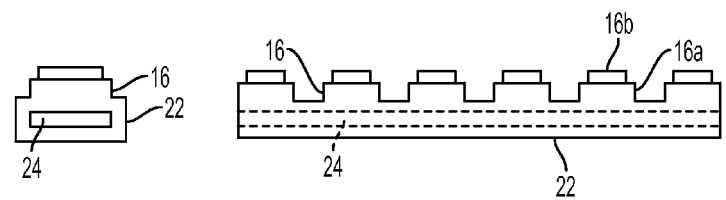
FIG. 3B is a front and side view of a portion of the example traction device of FIG. 2.

Referring to FIGS. 3A and 3B, an embodiment is shown where the traction elements 16 are located on one or more sleeves 22 that can be attached to the elongated band 18. Sleeve 22 can include one or more structures that allow the sleeve 22 to be attached to the elongated band 18. For example, in the embodiment of FIGS. 3A and 3B, the sleeve includes an aperture 24 that is similar in size and shape to the cross-section of the elongated band 18, thereby allowing the elongated band 18 to slide in to the aperture 24. This type of configuration can allow the sleeve 22 and associated traction elements 16 to be re-used multiple times by removing the sleeve 22 from the elongated band 18 after use, and replacing the elongated band 18 and attached first and second locking segments 12, 14 with new ones.

According to an alternative embodiment, not shown, multiple sleeves 22, each with one or more traction elements 16, can be placed end-to-end on a single elongated band 18, for example, to accommodate tires having different widths. The traction elements 16 can be integral with the sleeve 22, or alternatively, can be secured to the sleeve 22, for example, by bonding, screwing, or other fastening techniques known in the art.

Figure 4:
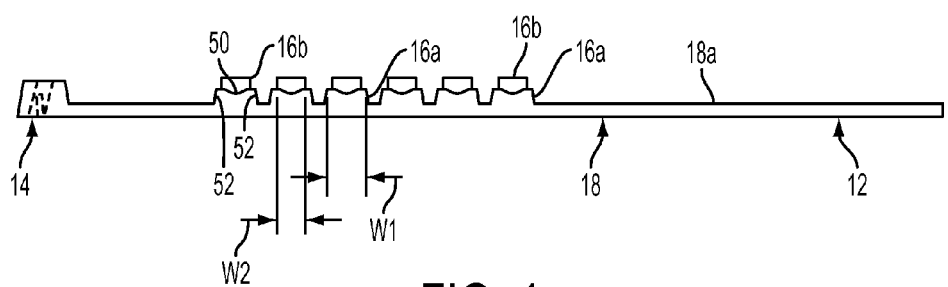
FIG. 4 is a side view of an example traction device according to a third embodiment.

FIG. 4 depicts an embodiment that is similar to the embodiment of FIGS. 1 and 2, except the traction elements 16 comprise a base portion 16a and a spike 16b that are integral with one another, e.g., co-molded with one another. The traction elements 16 can comprise a base 16a formed integrally with the elongated band 18, for example, co-molded. According to the embodiment shown, the base 16a protrudes above the upper surface 18a of the elongated band 18 and defines a plateau 50. The base 16a has sidewalls 52 angled inwardly from the elongated band 18a toward the plateau 50, as shown. According to the embodiment shown, a spike 16b is formed integrally with the base 16a, for example, co-molded. The spike 16b protrudes upwardly from the plateau 50, as shown. According to the embodiment shown, the plateau 50 defines a first width W1, and the spike defines a second width W2 along the plateau that is smaller than the first width W1.

Figure 5:
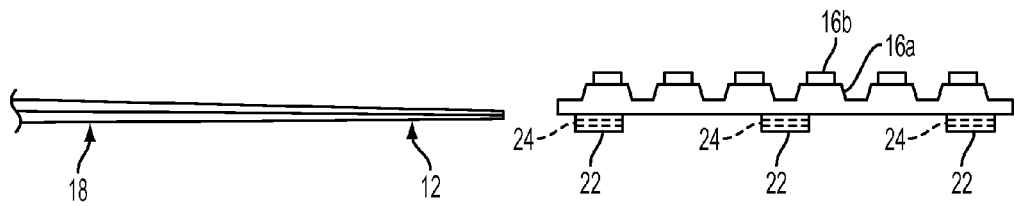
FIG. 5 is an exploded, side view of an example traction device according to a fourth embodiment.

FIG. 5 depicts an embodiment that is similar to the embodiment of FIG. 4, except that it includes multiple sleeves 22 that can be used to removably mount the traction elements 16 to the elongated band 18.

Figure 6:
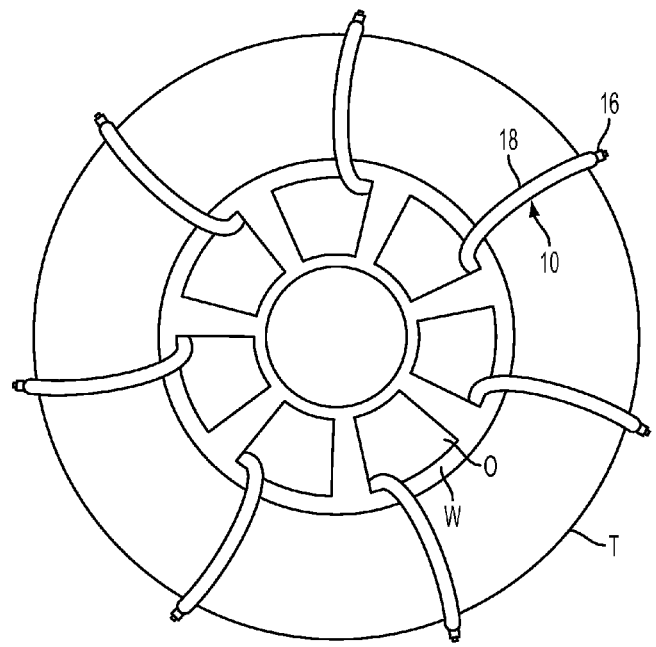
FIG. 6 is a side view of a vehicle wheel including example traction devices fastened around the rim and tire, according to a fifth embodiment.
Figure 7:
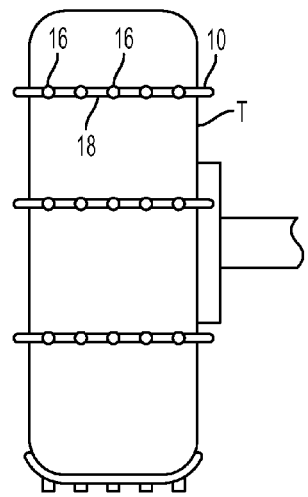
FIG. 7 is a front view of the vehicle wheel and traction devices of FIG. 6.
Figure 8:
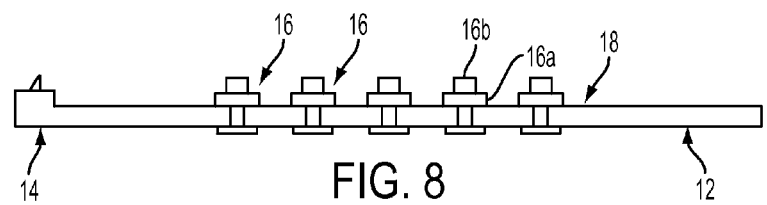
FIG. 8 is a side view of an example traction device of FIG. 6.

FIGS. 6-8 depict another embodiment where the traction elements 16 comprise rivets extending through the elongated band 18. According to an embodiment, the rivet washer can define the base portion 16a of the traction element 16, and the expanded tip of the rivet can define the spike portion 16b of the traction element 16, however, other configurations are possible.

Figure 9:
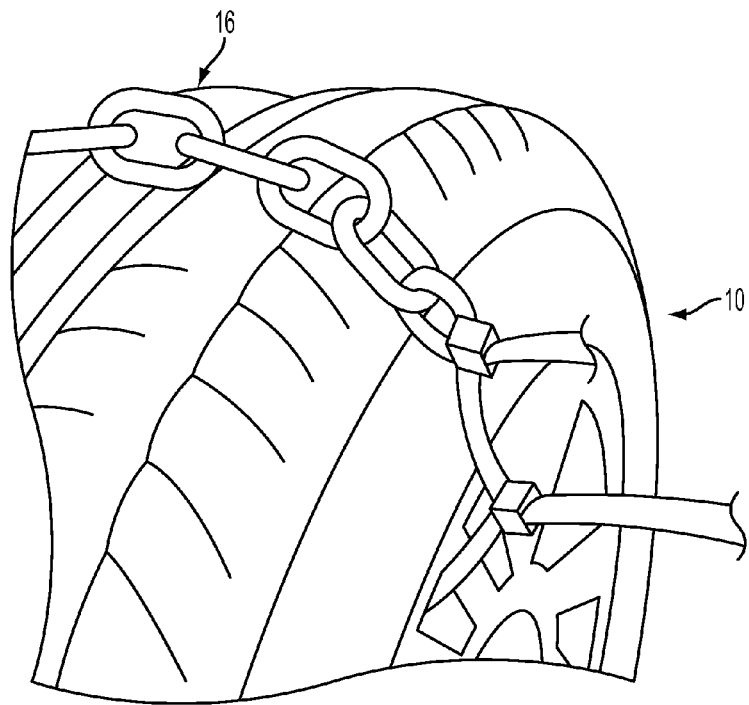
FIG. 9 is a rear-side view of a portion of a vehicle wheel including an example traction device fastened around the rim and tire, according to a sixth embodiment.
Figure 10:
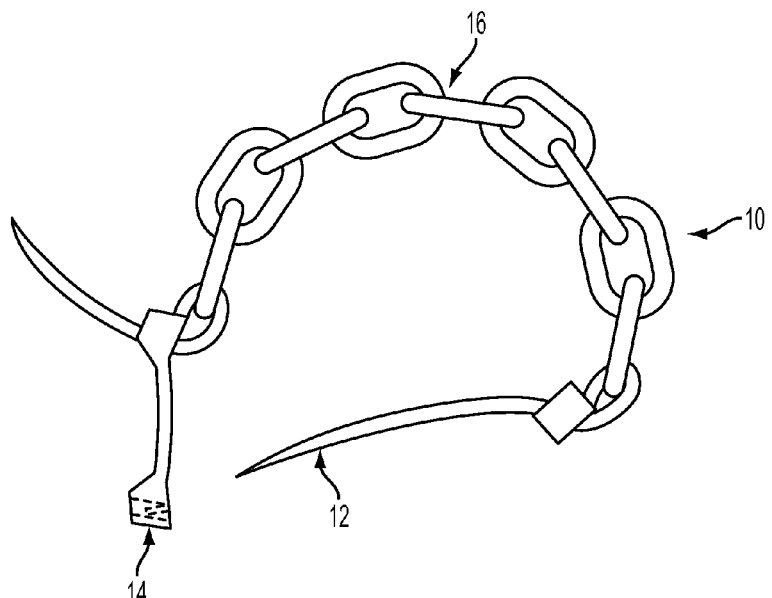
FIG. 10 is a side view of the example traction device of FIG. 9.

FIGS. 9 and 10 depict another embodiment of traction device 10, wherein the traction element 16 comprises a length of chain located between the first locking segment 12 and the second locking segment 14, which can be the same as or similar to the first and second locking segments described above. According to an embodiment, the first locking segment 12 can comprise a first zip tie looped around a first end of the chain 16, and the second locking segment 14 can comprise a second zip tie looped around a second end of the chain 16, however, other configurations are possible.

The traction device 10 of the aforementioned embodiments can define a length from the terminal end of the first locking segment 12 to the terminal end of the second locking segment 14 that is sufficient to wrap around a conventional vehicle rim and tire in the poloidal direction. For example, according to an embodiment for use with a passenger automobile, the aforementioned dimension can between about 16 inches and about 100 inches. According to an embodiment for use with a tractor, the dimension can be between about 150 inches and about 200 inches, for example, approximately 170 inches.

Referring back to FIG. 1, an example method of attaching a traction device 10 to a vehicle wheel W including a rim R and a tire T will now be described. The method can include inserting a first end of the traction device 10, for example, the first locking segment 12, through the opening O in the rim R. The user can wrap the traction device 10 around the rim R and tire T in a substantially poloidal direction P. Once the traction device 10 is wrapped around the rim R and tire T, the user can lock the first end of the traction device to a second end of the traction device to form a closed loop, for example, by connecting the first locking segment 12 to the second locking segment 14. If needed, the user can align the traction elements 16 over the tread portion of the tire T before or after fully tightening the traction device 10 on the wheel W. The user may attach multiple traction devices 10 to each wheel, depending on the amount of traction needed. When the user no longer needs the traction device(s) 10, for example, after they have reached their destination, or after the slippery road conditions have ceased, the user can remove the traction device(s) from the wheel W by severing either the elongated band 18 or one of the locking segments 12, 14. In the case of traction devices 10 having the traction elements 16 located on a sleeve 22, the user may re-use the traction elements 16 by replacing the used elongated band 18 with a new one, for example, by attaching the sleeve 22 and associated traction elements 16 to a new Zip Tie, and installing the rejuvenated traction device 10 on a tire, when needed.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A traction device for a vehicle wheel, comprising:
a first locking segment;
a second locking segment adapted to receive the first locking segment in a first direction, wherein the second locking segment is adapted to stop movement of the first locking segment through the second locking segment in a second direction opposite to the first direction;
at least one traction element located between the first locking segment and the second locking segment; and
an elongated band extending between the first locking segment and the second locking segment, the elongated band defining an upper surface and a lower surface;
wherein the traction element comprises:
a base formed integrally with the elongated band, the base protruding above the upper surface of the elongated band and defining a plateau, the base having sidewalls angled inwardly from the elongated band toward the plateau; and
a spike formed integrally with the base, the spike protruding upwardly from the plateau;
wherein the plateau defines a first width, and the spike defines a second width along the plateau that is smaller than the first width.

2. The traction device of claim 1, further comprising a metal reinforcing wire extending within the elongated band, the metal reinforcing wire extending along one side of the elongated band, into the second locking segment, and along another side of the elongated band.

3. The traction device of claim 1, wherein the first locking segment and the second locking segment comprise mating ends of a zip tie fastener.

4. The fraction device of claim 1, wherein the wheel includes a tire mounted on a rim, wherein the rim and tire define a poloidal dimension, and the traction device defines a length between the first locking segment and the second locking segment that is equal to or greater than the poloidal dimension.

5. The fraction device of claim 1, wherein the traction device defines a length between the first locking segment and the second locking segment that is between about 16 inches and about 100 inches.

6. A method of attaching a traction device to a vehicle wheel including a rim and a tire, the method comprising:
inserting a first end of the traction device through an opening in the rim;
wrapping the traction device around the rim and tire in a poloidal direction;
locking the first end of the traction device to a second end of the traction device to form a closed loop around the rim and tire in the poloidal direction; and
aligning a traction element of the traction device with a tread portion of the tire while the traction device is wrapped around the rim and tire; wherein the traction element comprises:
a base formed integrally with an elongated band, the base protruding above an upper surface of the elongated band and defining a plateau, the base having sidewalls angled inwardly from the elongated band toward the plateau; and
a spike formed integrally with the base, the spike protruding upwardly from the plateau;
wherein the plateau defines a first width, and the spike defines a second width along the plateau that is smaller than the first width.

7. The method of claim 6, wherein locking the first end of the traction device to the second end of the traction device comprises inserting a first locking segment located on the first end into a second locking segment located on the second end in a first direction, wherein the second locking segment substantially prevents movement of the first locking segment through the second locking segment in a second direction opposite to the first direction.

8. The method of claim 6, further comprising:
severing the elongated band of the traction device; and
removing the traction device from the wheel.

* * * * *